Dec. 19, 1922.
J. C. CASHMAN.
PRUNING KNIFE.
FILED DEC. 27, 1921.
1,439,225.
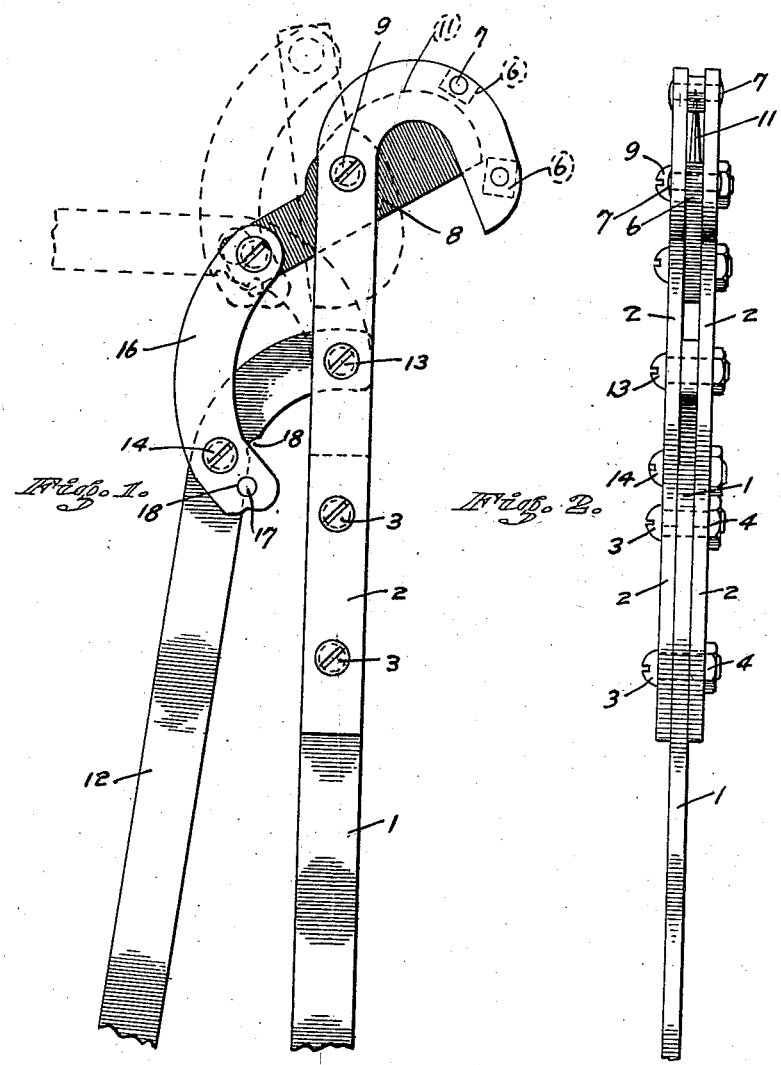
INVENTOR.
JOHN C. CASHMAN
BY
ATTORNEYS.

Patented Dec. 19, 1922.

1,439,225

UNITED STATES PATENT OFFICE.

JOHN C. CASHMAN, OF BALDWIN PARK, CALIFORNIA.

PRUNING KNIFE.

Application filed December 27, 1921. Serial No. 525,099.

*To all whom it may concern:*

Be it known that I, JOHN C. CASHMAN, a citizen of the United States, and a resident of Baldwin Park, county of Los Angeles, and State of California, have invented a new and useful Pruning Knife, of which the following is a specification.

The present invention relates to improvements in pruning knives and its particular object is to provide a knife of the character described which will be particularly effective due to the fact that the branch or limb to be cut is firmly gripped by the stationary portion of the device on three sides so that firm resistance is offered to the cutting edge operating from the fourth side. A further object of the invention is to mount the cutting blade in such a manner relative to the stationary limb engaging member that the blade cannot bend away from the former when put under severe strain.

With these and other objects in view I have illustrated the preferred form of my invention in the accompanying drawing in which Figure 1 represents a side elevation of my device and Figure 2 a front elvation of the same. While only the preferred form of the device is illustrated in the drawing, it will be understood that various changes or modifications as to the details of the construction may be made within the scope of the claim hereto attached without departing from the spirit of the invention.

The stationary member (1) which is shown broken away in the drawing and is provided at its bottom with a suitable wooden handle, not shown in the drawing, is made of a strip of metal of suitable strength and supports at its top end two parallel hook members (2) secured thereto by means of bolts (3) and nuts (4). The two hook members extend beyond the member (1) and are held in spaced relation to each other by a plurality of blocks (6) provided in suitable places and held by any suitable means such as the rivets (7).

Between the two hook members and right underneath their bent portions is supported the lever (8) by means of the pivot (9) so that the knife edge (11) of the lever which is rounded as shown in Figure 1 is adapted to cooperate with the hook in cutting a limb placed inside the latter. The lever (8) is actuated by means of a bell-crank lever (12) one end of which is pivotally supported between the two hook members underneath the pivot (9) as shown at (13). The fulcrum (14) of the bell-crank lever is pivotally connected with the free end of the lever (8) by means of two parallel links (16) while the free arm of the bell-crank lever which is considerably longer than the other arm extends downwardly substantially parallel to the stationary member (1) when the knife is closed and is provided at its bottom end with a similar wooden handle, not shown in the drawing. The two links (16) extend slightly beyond the pivot (14) and support a stop (17) adapted to engage one of its notches (18) in the bell-crank lever (15) so as to limit the motion of the latter in both directions.

The operation of the device will be easily understood especially in view of the fact that a second position is indicated in dotted lines in Figure 1. To operate the device the operator spreads the two handles so that the bell-crank lever (12) pushes, through the links (16), the free end of the lever (8) upward whereby the blade (11) is moved into the position shown in dotted lines in Figure 1. The hook is now slipped over the branch to be cut and the bell-crank lever (12) pulled downward when the blade will force its way through the branch until it reaches the near edges of the hook. At that time the stop (17) will prevent the handle of the bell-crank lever (12) from moving any further so that the hands of the operator are protected against injury.

I claim:

A pruning knife comprising a handle ending in a hook consisting of two members mounted in spaced relation to each other, a lever pivotally supported between the two members having a cutting edge adapted to cooperate with the hook in cutting limbs, means secured on the rear side of the handle for actuating the lever, said means comprising a bell-crank lever having one end pivotally secured between the two hook members, a pair of spaced links pivotally connecting the end of the first lever with the fulcrum of the bell-crank lever, a stop connecting the lower extremities of the links for limiting the motion of the bell-crank lever in either direction.

JOHN C. CASHMAN.